(12) United States Patent
Ohkawa (10) Patent No.: US 8,331,700 B2
(45) Date of Patent: Dec. 11, 2012

(54) IMAGE PROCESSING APPARATUS

(75) Inventor: Satoshi Ohkawa, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1087 days.

(21) Appl. No.: 12/254,263

(22) Filed: Oct. 20, 2008

(65) Prior Publication Data

US 2009/0123078 A1    May 14, 2009

(30) Foreign Application Priority Data

Nov. 14, 2007    (JP) .................................. 2007-296021

(51) Int. Cl.
*G06K 9/36* (2006.01)
(52) U.S. Cl. ....................................... 382/232
(58) Field of Classification Search .................. None
See application file for complete search history.

(56) References Cited

U.S. PATENT DOCUMENTS

| | | | | |
|---|---|---|---|---|
| 5,898,796 A | * | 4/1999 | Kumashiro | 382/252 |
| 2004/0213475 A1 | * | 10/2004 | Grohs | 382/243 |
| 2008/0002230 A1 | * | 1/2008 | Sakaue | 358/3.24 |

FOREIGN PATENT DOCUMENTS

| | | | | |
|---|---|---|---|---|
| JP | 11-252376 | | | 9/1999 |
| JP | 2001-211318 | | | 8/2001 |
| JP | 2001211318 | A | * | 8/2001 |
| JP | 2001-251522 | | | 9/2001 |
| JP | 2002-354257 | | | 12/2002 |
| JP | 3647347 | | | 2/2005 |
| JP | 2006-211513 | | | 8/2006 |
| JP | 2007088741 | A | * | 4/2007 |

OTHER PUBLICATIONS

Office Action issued Jun. 27, 2011, in Japan Patent Application No. 2007-296021.

* cited by examiner

*Primary Examiner* — Bhavesh Mehta
*Assistant Examiner* — Nirav G Patel
(74) *Attorney, Agent, or Firm* — Oblon, Spivak, McClelland, Maier & Neustadt, L.L.P.

(57) ABSTRACT

An image processing apparatus includes an input processing unit which generates image data and attribute data indicating an attribute of each pixel of the image data from inputted data, a first data compression unit which compresses the image data generated by the input processing unit, a second compression unit as a lossy data compression unit to compress the attribute data generated by the input processing unit, a first expansion unit which expands the image data compressed by the first data compression unit, a second expansion unit which expands the attribute data compressed by the second data compression unit, and an output image processing unit which processes the image data expanded by the first expansion unit with a process condition for the attribute data expanded by the second expansion unit to output the image data expanded by the first expansion unit as image data with predetermined data characteristics.

5 Claims, 5 Drawing Sheets

| EDGE | EDGE | EDGE |
|---|---|---|
| GRAPHIC | TARGET PIXEL GRAPHIC | GRAPHIC |
| GRAPHIC | GRAPHIC | GRAPHIC |

IMAGE PROCESSING APPARATUS

BACKGROUND OF THE INVENTION

1. Field of the Invention

The present invention relates to a data process to process data, such as a file inputted by a scanner or a PC, into general compressed image data and process the compressed image data to be outputted. More specifically, the invention relates to an image processing apparatus that performs an output image process to remove noise generated in restoring and outputting the compressed image data.

2. Description of the Related Art

In recent years, processing of document images has changed from analog processes to digital processes due to the development of reading by line sensors formed of CCD (Charge-Coupled Devices) units and laser printing. Digital multifunction peripherals are widely known as image processing apparatus using such techniques.

A digital multifunction peripheral performs various functions such as a scanner function, a printer function, a facsimile (FAX) function, and the like in addition to a copying function. A processing unit commonly used by these functions is provided in the digital multifunction peripheral. A machine incorporating these functions is predominantly used and called a digital multifunction peripheral (MFP: Multifunction Peripherals), which controls the multifunction (see Patent Document 1).

The multifunction (functions of a printer, a scanner, internet FAX, and the like) of the digital multifunction peripheral connected to the network can be used by external devices on the network.

Therefore, outputs from the MFP include an output onto paper for copying and an output by sending electronic data for scanner and FAX delivery. Also, in sending electronic data, there are different output formats depending on the intended purpose. For example, a binary image data format is used for the FAX delivery, while a color RGB image data format, for example, is used for the scanner delivery. Moreover, the MFP outputs image data by different output units such as a writing unit in the paper output and a display of a PC (Personal Computer) to display the delivered image data in the scanner delivery. Therefore, appropriate processes are required for each output.

The output image data and the like processed when the multifunction such as a copying function is used through the network are stored in an internal HDD (Hard Disc) or the like so that the stored image data can be reused and outputted.

Even the HDD with high capacity, however, has a limit in its data storage capacity. When printing a full color image with a resolution of 600 dpi, for example, a color image of one A4 page has quite a large data volume of about 120 MB.

Thus, in the MFP having an output unit capable of printing color images, color image data are compressed when stored in a storage device such as an HDD and expanded in the MFP when printing the expanded image data so that time required to transfer data becomes shorter and the required memory capacity becomes smaller; thereby making processes more efficient and the structure simpler. This data compression is employed not only in the MFP but for data sent outside the MFP through the network for similar effects.

A compression method of image data may be a lossless compression method for a multifunction peripheral which processes mainly documents of monochrome text or line drawings. To process color image data, however, a more general lossy compression method such as JPEG (Joint Photographic Expert Group) is better in many cases.

The JPEG compression method is effective for inputted images such as photographs, however, there is a problem that mosquito noise is generated in a line drawing such as a CG (Computer Graphic) image, text, and CAD (Computer Aided Design) restored by expansion. As a result, image quality of the restored image is degraded.

Patent Documents 2 and 3 disclose the related arts to solve the aforementioned problems.

Patent Document 2 discloses a method to remove noise generated in expanding a data-compressed image by applying an appropriate filter process determined by a compression rate and an image attribute such as text, a graphic image, and halftone dots to image data after decompression.

Patent Document 3 discloses a method to find whether a target pixel and its peripheral pixels of an expanded image match a predetermined noise detection bit map pattern, and if they match, apply a correction to a noise pixel to remove the noise.

Patent Document 1: Japanese Patent No. 3647347
Patent Document 2: Japanese Patent Application Publication No. 2001-211318
Patent Document 3: Japanese Patent Application Publication No. 2002-354257

In Patent Document 1, however, noise is removed by the filter process, which is not very effective in reducing noise depending on the image data. In Patent Document 2 also, noise is removed by using the predetermined noise detection bit map pattern, therefore, a precision of noise detection is sometimes low depending on the detected image data, which means this method is not very effective in reducing noise depending on the image data.

SUMMARY OF THE INVENTION

It is an object of at least one embodiment of the invention to provide effective noise reduction for any image data unlike the aforementioned related arts and to increase the effectiveness of noise reduction regardless of the diversity of image data.

According to one aspect of the invention, an image processing apparatus includes an input processing unit which generates image data and attribute data indicating an attribute of each pixel of the image data from inputted data, a first data compression unit which compresses the image data generated by the input processing unit, a second compression unit which is a lossy data compression unit to compress the attribute data generated by the input processing unit, a first expansion unit which expands the image data compressed by the first data compression unit, a second expansion unit which expands the attribute data compressed by the second data compression unit, and an output image processing unit which processes the image data expanded by the first expansion unit with a process condition corresponding to the attribute data expanded by the second expansion unit to output the image data expanded by the first expansion unit as image data with predetermined data characteristics. The output image processing unit has a specific attribute area correcting unit which performs a correcting process to remove noise of a pixel in the expanded image data, which is caused by the compression, by replacing an image data value of the pixel having a specific attribute with a value corresponding to the specific attribute.

According to another aspect of the invention, an image processing apparatus includes an input processing unit which generates image data, attribute data indicating an attribute of each pixel of the image data, and data indicating an inputted document type attached to inputted data from the inputted data, a first data compression unit which compresses the image data generated by the input processing unit, a second data compression unit which is a lossy data compression unit to compress the attribute data and the data indicating the inputted document type which are generated by the input processing unit, a first expansion unit which expands the image data compressed by the first data compression unit, a second expansion unit which expands the attribute data and the data indicating the inputted document type which are compressed by the second data compression unit, and an output image processing unit which processes the image data expanded by the first expansion unit with a process condition corresponding to the attribute data and the data indicating the inputted document type which are expanded by the second expansion unit to output the image data expanded by the first expansion unit as image data with predetermined data characteristics, and a control unit which turns on and off the correcting process of the specific attribute area correcting unit depending on the inputted document type of the image data. The output image processing unit has a specific attribute area correcting unit which performs a correcting process to remove noise of a pixel in the expanded image data, which is caused by the compression, by replacing an image data value of the pixel having a specific attribute with a value corresponding to the specific attribute.

According to another aspect of the invention, an image processing apparatus includes an input processing unit which generates image data, attribute data indicating an attribute of each pixel of the image data, and data indicating an inputted document type attached to inputted data from the inputted data, a first data compression unit which compresses the image data generated by the input processing unit, a second data compression unit which is a lossy compression unit to compress the attribute data and the data indicating the inputted document type which are generated by the input processing unit, a first expansion unit which expands the image data compressed by the first data compression unit, a second expansion unit which expands the attribute data and the data indicating the inputted document type which are compressed by the second data compression unit, and an output image processing unit which processes the image data expanded by the first expansion unit with a process condition corresponding to the attribute data and the data indicating the inputted document type which are expanded by the second expansion unit to output the image data expanded by the first expansion unit as image data with predetermined data characteristics. The output image processing unit has a specific attribute area correcting unit which performs a correcting process to remove noise of a pixel in the expanded image data, which is caused by the compression, by replacing an image data value of the pixel having a specific attribute with a value corresponding to the specific attribute, and a specific document correcting unit which performs a correcting process to remove the noise caused by the compression, which is left in the image data outputted from the specific attribute area correcting unit, by correcting a data value of a pixel of the image data of a specific inputted document type by using a value corresponding to the specific inputted document type.

According to at least one embodiment of the invention, image data including noise generated in restoring compressed data are replaced in a pixel level with appropriate image data corresponding to the image attribute to be corrected. In this manner, image data before compression with noise removed can be restored correctly and an effect to reduce the degradation of an output image can be enhanced regardless of the diversity of image data.

DETAILED DESCRIPTION OF THE PREFERRED EMBODIMENTS

An embodiment of an image processing apparatus of the invention is described below.

In the following embodiment, an image processing apparatus of the invention is applied to a color digital multifunction peripheral (MFP).

A configuration and an operation of the MFP of this embodiment are described by two examples of data inputted to generate image data; data inputted by reading a document by a scanner and data inputted by an external host device requesting a print output.

Major components of the MFP of this embodiment includes a unit to temporarily store and accumulate image data obtained by inputted data in a storage unit such as an HDD (hereinafter called an "HDD or the like"). The unit then processes the stored image data based on an attribute or an inputted document type of the stored data to output the processed data by a plotter or sending externally. A similar output method can be employed for sending facsimiles in addition to the outputs by a plotter, sending data to a PC, and the like.

"Outline of MFP (Digital Multifunction Peripheral)"

Figure 1:
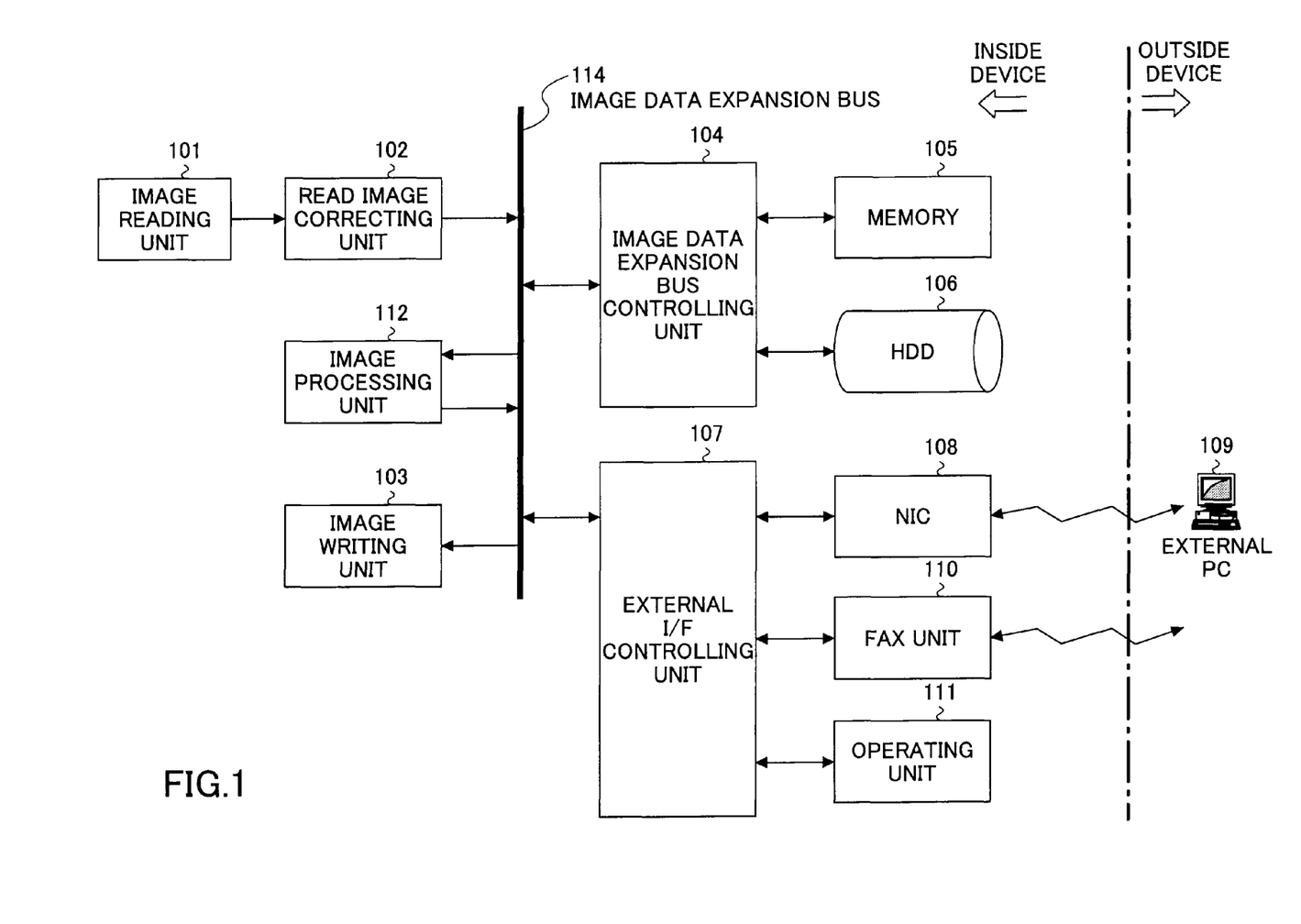
FIG. 1 is a block diagram showing a schematic configuration of an MFP according to embodiments of this invention.

FIG. 1 is a block diagram showing a schematic configuration of the MFP of this embodiment. A process system of the MFP shown in FIG. 1 has two prominent systems; an input system which stores and accumulates image data read and inputted by a scanner of the MFP and data sent by an external PC 109 or the like in an HDD or the like, and an output system which outputs the data by a plotter and by sending the data to the external PC 109 or the like based on the image data processed in the input system, including the image data stored and accumulated in the HDD.

The input system includes an image reading unit 101, a read image correcting unit 102, an image data expansion bus 114, an image data expansion bus controlling unit 104, and an HDD 106 or a memory 105 as major components.

The output system includes the HDD 106 or the memory 105, the image data expansion bus 114, the image data expansion bus controlling unit 104, and an image processing unit 112 in common with the input system. An image writing unit 103 is included as a major component for a plotter output and an external interface (I/F) controlling unit 107 and an NIC (Network Interface Card) 108 are included as major components for sending data to the external PC 109 or the like.

The MFP operates a function selected by a user from copying, printing, sending facsimile, scanning, using a document box, and the like as the multifunction to output an image.

Input and output operations executed by the MFP differ depending on the selected function. Input and output operations from a document input to a plotter output are performed as a series of operations in some cases as in a copying function. However, when the document box function to accumulate and store the data inputted to the MFP through various multifunction is provided to reuse the stored data for outputs, only an input operation or an output operation may be independently performed. Depending on the used function, the input system and the output system as described above are used.

As the outline of the MFP, processes are described below with examples of the copying function and the printing function.

"Process Outline of Copying Function"

When performing the copying function including a series of processes from reading of a document to a print output, a document is read first. The image reading unit 101, which reads the document set in a reading position or optically reads an image of the document passing through the reading position, includes an optical unit formed of a light source and a mirror, a CCD line sensor and an A/D converter which photoelectrically convert the image, and a detecting and processing circuit for read signals, which is formed of driving circuits of the aforementioned units. A moving rate of the optical unit is variable depending on the scale ratio of the image. The moving rate can be changed in a direction crossing a vertical scanning direction, that is the sensor line direction, by slowing down the rate for enlargement and speeding it up for size reduction.

When a color CCD line sensor is used, the read image is photoelectrically converted into pixel row signals of each color separation light; R (red), G (green), and B (blue), and sent to the read image correcting unit 102 as, for example, 8-bit RGB data.

The document to be read is set in the reading position of the reading unit by a user, set by an ADF (Automatic Document Feeding device) which automatically feeds documents on a document stage one by one, or simply passes through the reading position by the ADF. A rate to pass through this reading position is also variable depending on the scale ratio. The rate is also variable in the vertical scanning direction in accordance with the scale ratio, by slowing down the rate for enlargement and speeding the rate up for size reduction.

The read image data are sent to the read image correcting unit 102. The read image correction unit 102 normalizes the read image data which depends on the device characteristics of the image reading unit 101 and then applies a correcting process to improve the image quality of the image data.

Figure 2:
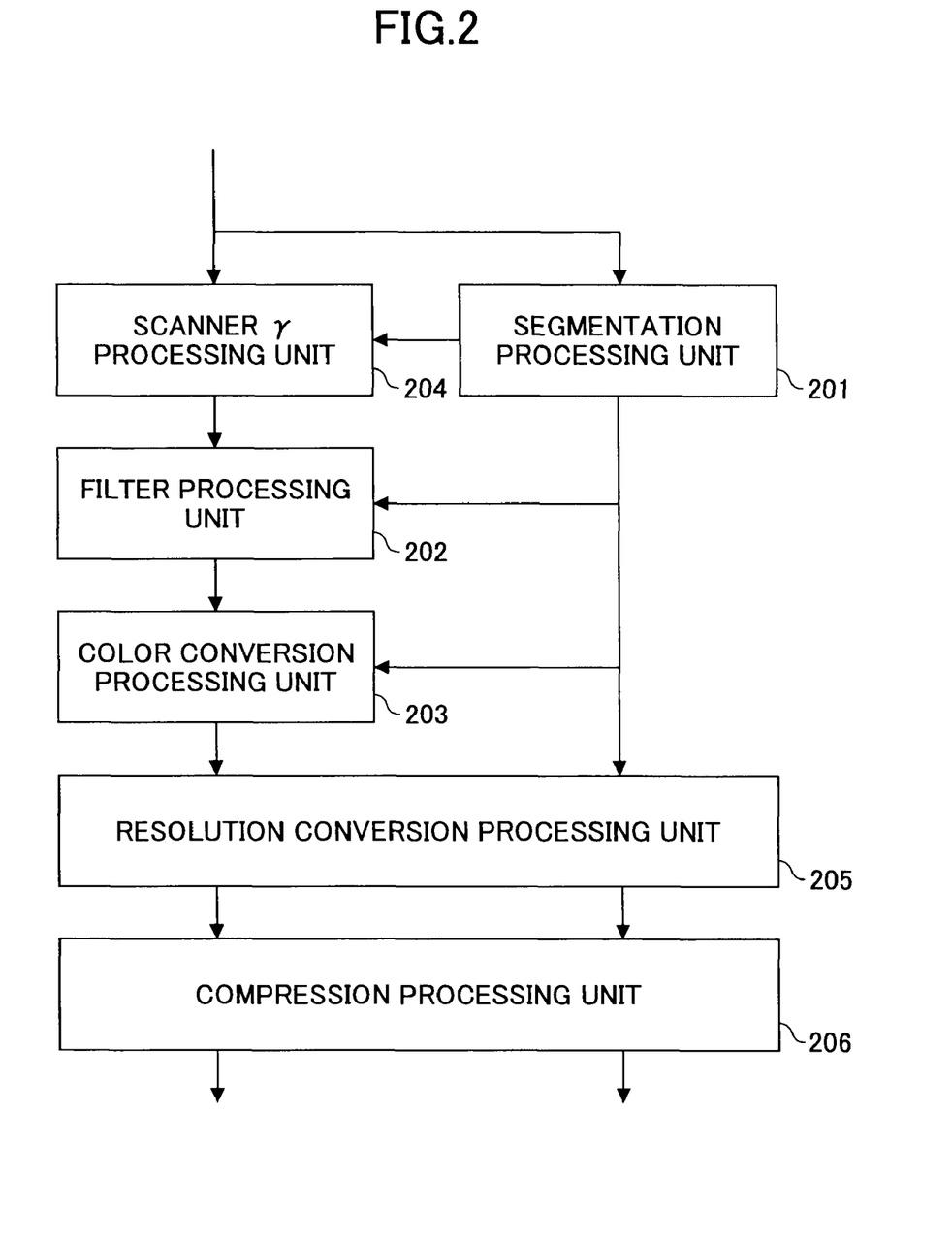
FIG. 2 is a diagram showing an internal configuration and a data flow of a read image correcting unit (see FIG. 1)

FIG. 2 is a diagram showing an internal configuration and a data flow of the read image correcting unit 102.

A correcting process is described with reference to a circuit configuration and the data flow of the read image correcting unit 102 in FIG. 2.

A document image of the image data inputted by the image reading unit 101 is first analyzed with predetermined features in a segmentation processing unit 201, and then an area having the feature in the document image is extracted as segmentation data. The features include determination of a halftone dot portion, an edge portion of a character or the like, whether the image data are colored or colorless, whether a background image is white, and the like formed on the document by general printing. The segmentation data indicate image areas with these features.

The image data read by the image reading unit 101 are inputted to a scanner γ processing unit 204, where γ characteristics of the image reading unit 101 are γ-converted into device independent output characteristics.

The image data outputted from the scanner γ processing unit 204 are then inputted to a filter processing unit 202. The filter processing unit 202 converts a space frequency of the image data. Here, a predetermined filter process is applied to each segmentation area by using the segmentation data obtained by the segmentation processing unit 201. In an area detected as a halftone dot area, a smoothing process to smooth the halftone dot is applied. In an edge area with a white background, the area is assumed as a text portion, to which an edge reinforcing process is applied for better MTF (Modulation Transfer Function) features.

The image data processed in the filter processing unit 202 are then inputted to a color conversion processing unit 203. The color conversion processing unit 203 applies a color conversion process to the RGB image data read by the image reading unit 101 into an image with characteristics appropriate for an image output. The image data are converted into RGB data in a predetermined space in consideration of a consistency with a process performed in the image processing unit 112 in an output stage. This is because a copy output is instructed here and the image data for the plotter output are converted into CMYK image data in the image processing unit 112, which is described below. The case of accumulating the read image data in the HDD 106 or the like and reusing the accumulated image data is described below.

In a resolution conversion processing unit 205, a resolution of the image data is converted into a resolution corresponding to a requested image output to output the image data. For example, when the read image data have a resolution of (600 dpi horizontal×300 dpi vertical) and require an image output of (300 dpi×300 dpi), the resolution conversion processing unit 205 reduces the resolution of the horizontal direction to half to output the image data with a required resolution. As for the scaling process at this time, the image data are converted by an arithmetic process by a three dimensional convolution or the like. The segmentation data indicate segmentations corresponding to the converted image data.

After this, the image data after the resolution conversion process and the result of the segmentation processing unit 201 are compressed by a compression processing unit 206. At this time, a compression rate can be set high for the image data. For example, a lossy compression method such as JPEG is used. As for the data outputted from the segmentation processing unit 201, however, a lossless compression method is required to be used since the data are dependent on the pixel position.

The compressed image data and the segmentation data of the image are also accumulated in the HDD 106 temporarily through the memory 105. At this time, the data accumulated through compression processes by different compressing methods may independently undergo compression, however, dependence between these data is required to be kept and managed so that the dependence data can be used in a subsequent processing unit.

Further, the HDD 106 functions as a buffer for the output system. That is, a buffer is not required when image data can continually be sent to the image writing unit 103 of the plotter output system at the same timing as a document image being read by the image reading unit 101. When the output is stopped for preparing outputs or the like, however, the image data cannot be outputted while the image data is continually inputted, which overflows the limited capacity of the memory 105. Increasing the capacity of the memory 105 leads to an increase in cost. In view of solving the problem of small capacity of the memory 105, the HDD 106 with large capacity is used as a buffer to store the image data temporarily.

After this, processes in the output system start. The image data are sent from the memory 105 to the image processing unit 112. In the image processing unit 112, the data corrected and converted by the read image correcting unit 102 on the input stage into an RGB image with predetermined characteristics are converted into CMYK image data for image writing with device dependent characteristics to perform a plotter output.

Figure 3:
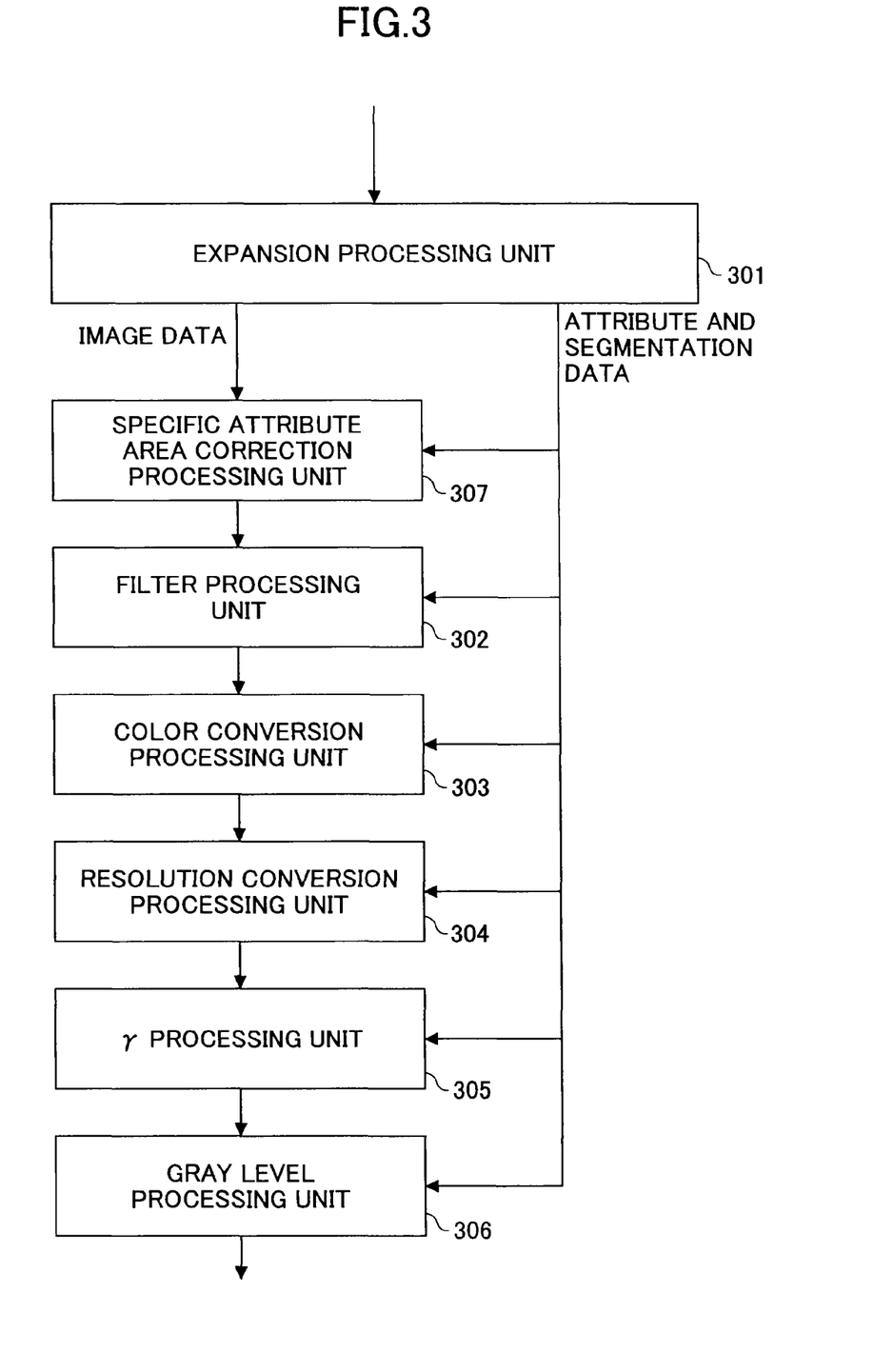
FIG. 3 is a diagram showing an internal configuration and a data flow of an image processing unit (see FIG. 1)

FIG. 3 is a diagram showing an internal configuration and a data flow of the image processing unit 112.

With reference to FIG. 3, processing of image writing data is described in accordance with the circuit configuration and the data flow of the image processing unit 112.

The data inputted from the HDD 106 through the memory 105 include the image data and the segmentation data. First, the image data and the segmentation data compressed by the compression processing unit 206 are expanded by an expansion processing unit 301.

After this, noise generated in restoring the JPEG compression data is removed by a specific attribute area correction processing unit 307. This noise is removed by a process to correct the image data in accordance with an attribute (segmentation data) of the image data. The image attribute which requires removal of noise caused by the JPEG compression and a correcting process of the noise are described in Embodiments 1 to 5 below.

Subsequently, a filter process is applied by a filter processing unit 302 to the image data so as to correspond to the MTF characteristics of the image writing unit 103. In the aforementioned filter processing unit 202 in the read image correcting unit 102 of the input system, the image data are corrected to have predetermined characteristics to be accumulated in the memory 105, the HDD 106, or the like. In the filter processing unit 302 of the output system, however, filters are selected to convert the image characteristics determined in the accumulation. As a result, characteristics corresponding to the image characteristics of the image writing unit 103 of the MFP which writes this image data can be obtained. A filter process required for each segmentation area is applied with reference to the segmentation data similarly to the aforementioned input system.

After the process in the filter processing unit 302, the data for image writing are sent to a color conversion processing unit 303. The RGB image data are converted into image data of four colors; C (cyan), M (magenta), Y (yellow), and K (black). For example, when a pixel corresponding to black text is detected by using the segmentation data detected by the segmentation processing unit 201, a monochrome process is applied in a CMYK process to the pixel detected as the black text.

The image signals processed by the color conversion processing unit 303 may undergo a scaling process in a resolution conversion processing unit 304.

The image signals with the converted resolution is sent to a γ processing unit 305. In the γ processing unit 305, output characteristics are γ-converted from the image characteristics determined in the accumulation to characteristics corresponding to the image characteristics of the image writing unit 103 of the MFP which writes this image data.

Subsequently, by using the processed data of the γ processing unit, a grayscale process by a dither process or an error diffusion process is applied to the image data in a gray level processing unit 306 so that characteristics corresponding to the characteristics of the image writing unit 103 can be obtained. At the same time, a grayscale level (number of bits) of the image writing unit 103 is converted here as well. When an output of 1-bit signal is required, for example, a dither process is performed to convert an inputted 8-bit signal into a 1-bit signal.

In this manner, the CMYK image data for image writing, which is processed by the image processing unit 112 is inputted to the image writing unit 103 again through the memory 105, and if required, the HDD 106.

The image writing unit 103 which receives the CMYK image data for image writing drives a laser light source provided for each of the CMYK colors by using the CMYK image data to optically write the data in photoreceptors by a laser beam. Through an electronic photo process including development, transfer, and fixing processes with a toner, a copy output image is formed on transfer paper.

The aforementioned copy output is executed as a series of operations. The image data are transferred in the order from the image reading unit 101, the read image correcting unit 102, the image processing unit 112, and to the image writing unit 103. Inputs and outputs of these data transfers are performed through the image data expansion bus 114 controlled by the image data expansion bus controlling unit 104.

In these transfer operations, for example, when outputting the image data processed by the image processing unit 112 from the image writing unit 103, the image data are not sometimes ready to be outputted onto paper in an engine plotter state. In such a case, the image data are held in a storage device of the memory 105 such as a RAM and the HDD 106 temporarily.

The image data expansion bus 114 is shared by each module. Therefore, the image data expansion bus controlling unit 104 that controls inputs and outputs to/from the image data expansion bus 114 controls the transfer operations of the image data among processing units including the memory 105 and the HDD 106.

When the image data are read by a scanner, inputted by the image reading unit 101, and transferred to the image processing unit 112, for example, there is a case another image process is performed by the image processing unit 112 when reading the image data by the image reading unit 101, though depending on the transfer rate and the process. In view of this, the memory 105 has memory capacity to hold plural image data and is controlled in access to make parallel processing possible. After that, the image data held in the memory 105 are stored in the HDD 106 as required to reuse the image data for processes to print double-sided, aggregate the data for printing, and the like.

"Accumulation and Reusing of Inputted Image Data in HDD"

In the above description, the process to achieve a copy output through the series of operations from the image reading to the plotter output is described. The storage device such as the memory 105 and the HDD 106 is used to streamline the processing of the image data read from a document. In the aforementioned process of the copy output, a storage device such as the HDD 106 is used as temporary storage for the read image data. The HDD 106 is a device that the stored data are not deleted even if power is turned off and can store a large amount of data. Therefore, the inputted image data can be accumulated in the HDD 106 to be reused.

A configuration to use the HDD 106 as the storage of data to be reused is described.

The image data accumulated in the HDD 106, which are sometimes used in this MFP for a re-plotter output by using the document box function, can be used by the external PC 109 or the like as in the case of using the scanner function. Therefore, the image data are converted into general RGB data or RGB data in a predetermined space, which is thought appropriate in consideration of the convenience in using the accumulated data by the external PC 109 or the like. In the case where an importance lies on the reusing of the image data for a plotter output in this MFP, the data accumulated in the HDD 106 or the like may be converted into RGB data or CMYK data appropriate for the plotter output (see the aforementioned description of the color conversion processing unit 203).

In the process to accumulate the read image data in the HDD 106, which is similar to the process in the read image correcting unit 102 shown in FIG. 2, the image data are converted into device independent image data.

As characteristics of the device independent image data, there are sYCC and an Adobe RGB space as standard color spaces, an RGB space commonly determined in advance as a device, and the like. The image data are converted by using the color conversion processing unit 203 with these color space settings. Moreover, a space frequency and the like are also converted by using the filter processing unit 202 of the read image correcting unit 102 with the settings to obtain standard image characteristics. The read image data are converted in this manner in the read image correcting unit 102 prior to being accumulated in the HDD 106 to be reused.

In performing a plotter output in this MFP by reusing the image data accumulated in the HDD 106, image processing conversion is performed to convert the device independent characteristics of the image data to characteristics appropriate for the characteristics of the image writing unit 103.

"Process Outline of Printer Function"

When data are inputted requesting a print (plotter) output to the image processing apparatus, there is a case to use the printer function instead of using the copying function. For the printer function, the data are transferred and inputted by a host device such as the external PC 109 through the network in, for example, a general PDL (Page Description Language) such as PostScript (registered trademark).

The PDL of the data inputted requesting a print output is decoded, of which result is used to generate image data which can be used for the plotter output. The generated image data for the plotter output are accumulated in the HDD 106 in the aforementioned format capable of being reused.

The data inputted in the PDL are processed as follows. First, the PDL data requesting a print output are sent from the external PC 109 to the image processing apparatus through the NIC 108.

An external I/F controlling unit 107 which receives this PDL data decodes and expands the PDL data as image data. At this time, the inputted data to be accumulated in the HDD 106 and reused using the document box are, for example, expanded into general RGB data as described above. In addition, attribute data referred to for attaching a predetermined process condition to the image data in processing the accumulated image data into output data are also expanded.

This attribute data indicate the data of each pixel in the image data. In this sense, the attribute data are similar to the aforementioned segmentation data in the process of reading a document image (see the description of the segmentation processing unit 201 in FIG. 2).

This attribute data indicate features of each pixel of the image data; for example, a text image formed of a font, an image of image data such as a photograph, or a graphic image. The image data and the attribute data of the image obtained from the PDL data are compressed, accumulated and managed in the HDD 106. As the image data accumulated in the HDD 106 are to be reused in this case, the image data are to be accumulated in a general color space similarly to the document image read and inputted by a scanner.

When performing a print output of the image data accumulated in the HDD 106, the image data are processed into image data appropriate for the characteristics of the image writing unit 103 by the image processing unit 112 to be used for the plotter output, similarly to the above description.

"Noise Correcting Process"

The image data accumulated in the HDD 106 are compressed by JPEG or the like as described above. When outputting an image using this accumulated image data, the image data are required to be restored into image data before compression through the expansion processing unit 301 as described above.

When expanding the data compressed by the lossy compression method such as JPEG, mosquito noise is generated in the image restored by expansion, which degrades the image.

As the noise generated in this restored image has conventionally been a problem, a method to remove the noise has been suggested. However, the conventional method is not very effective in reducing a high noise in a variety of image data as described in the background of the invention.

In view of this, focusing on an attribute of a pixel in the image data in this embodiment, the image data before compression is restored by replacing an image data value of a pixel having a specific attribute after expansion with a value corresponding to the attribute. That is to say, even if noise is generated in the expanded image data, a correcting process to remove the noise is performed by replacing a value of a pixel having a specific attribute with an originally appropriate value.

This correcting process as described above can be applied to a pixel as long as the pixel satisfies a condition that the pixel having a specific attribute and a data value originally appropriate for the pixel are surely related.

Embodiments of the aforementioned correcting process to remove noise generated in the expanded image data are described in Embodiments 1 to 5 below.

Embodiment 1

In a correcting process of this embodiment, a specific attribute included in PDL data and segmentation data is used as an attribute satisfying the aforementioned condition.

When attribute data obtained in processing the PDL data sent by the external PC 109 requesting a print output includes, for example, attribute data indicating a white background, this attribute is originally to make an image data value indicate "white". Therefore, when the attribute data referred to in performing the image output process based on the PDL data requesting an output have an attribute indicating a white background, the image data of the pixel to be outputted are replaced with a data value of "white".

Similarly, when segmentation data obtained in processing the document read image inputted by a scanner include data indicating a white background, for example, this area is to have an image data value indicating "white". Thus, the image data of the pixel to be outputted is replaced with a data value of "white" based on this segmentation data in performing the image output process.

This correcting process is performed in an image output process. Here, the correcting process is performed in processing the image writing data described with reference to FIG. 3. That is, in the image processing unit 112 shown in FIG. 3 which performs a process to receive an input of image data accumulated in the HDD 106 and output the image writing data, the correcting process is performed by the specific attribute area correction processing unit 307 provided in this process.

The data used for outputting an image, which are compressed and accumulated in the HDD 106, are expanded through the expansion processing unit 301 and inputted to the specific attribute area correction processing unit 307 first when outputting the image. The image data and the segmentation data or the attribute data of this image data (hereinafter these data are simply referred to as "attribute data") are inputted. Receiving inputs of these data, the specific attribute area correction processing unit 307 performs a correcting process to remove noise generated in the image data in expansion.

In the case where the attribute data of the inputted image data indicate, for example, a white background, the specific attribute area correction processing unit 307 replaces a data value of the inputted image data with an originally correct image data value of, for example "255". Moreover, when the attribute data of the inputted image data indicate, for example, "uniform data", all pixels with this attribute are set to have the same RGB data. Then, this data are replaced with a data value of the inputted image data having the attribute of "uniform data".

As described above, an effect to reduce degradation of the output image can be enhanced regardless of the diversity of image data by performing a correcting process to remove noise generated in the image data in expansion by using an originally correct data value corresponding to the attribute data and segmentation data of the pixel in the image data.

Embodiment 2

In this embodiment, a unit to control the correcting process of Embodiment 1 is provided. In Embodiment 1, a process to correct noise is performed without providing any limit to image data requested to be processed. However, the correcting process has no correction effect on some kinds of images, for which the correcting process is not required.

In view of this, the correcting process is turned off for the specific kinds of images which are not corrected; thereby the performance is enhanced in this embodiment.

In the case of processing a print request made by the external PC 109, PDL data are normally received and a kind of data to be outputted is known at this time in many cases. For example, information about a document type such as whether the data used for printing is image data of text only or JPEG image data formed of a photograph taken by a digital camera as a source, is determined by the external PC 109 which requests printing. The PDL data inputted by the external PC 109 include a document type as bibliographic data attached to the image data. Needless to say, this bibliographic data include the attribute data described in Embodiment 1 as well.

The image data sent by the external PC 109 are accumulated in the HDD 106 temporarily and processed as data used for a plotter output by the image processing unit 112 in accordance with an output of the image writing unit 103. At this time, the document image data used for an output may be data such as a photograph taken by a digital camera. The photograph or the like taken by a digital camera is data with a natural image over a whole area. This kind of natural image already has noise when taken to form document image data. Moreover, compression such as JPEG is already applied to the accumulated document image data, and there are few images in such a frequency range that noise caused by JPEG can be seen.

Therefore, no noise correction is required for such images. In order to turn off the noise correcting process for such document image data, the document type and attribute data included as the bibliographic data in the image data to be printed are referred to. When the referred data show that the image data are a photograph taken by a digital camera, the process of the specific attribute area correction processing unit 307 is turned off based on this information to omit the noise correcting process.

On the other hand, when image data to be processed are found to be graphic data such as CAD or an text image based on a document type and attribute data included as bibliographic data in the image data, it is obvious that noise effect appears on an output image due to JPEG compression performed when accumulating the image data in the HDD 106 after the input. In such a case, the specific attribute area correction processing unit 307 applies noise correction to the image data depending on the document type and the attribute data.

In the case where an inputted document type such as JPEG and TEXT or attribute data such as text or a photograph is attached to a file requested to be printed and a noise correcting process of the whole image can be controlled by using the attached document type or the attribute data, the noise correction can be performed by using either of the inputted document type and the attribute data.

In addition, there is a case that a kind of image cannot be determined by the inputted document type. For example, there is a case that a TEXT image and a photographic image taken by a digital camera are mixed. In such a case, appropriate correction can be applied to the image data by using the attribute data in the specific attribute area correction processing unit 307, leaving the inputted document type data.

In this manner, by applying noise correction to image data by using one or both of the inputted document type and the attribute data, an appropriate process can be performed and an effect to reduce the degradation of an output image can be enhanced regardless of the diversity of image data.

Embodiment 3

In this embodiment, a unit to perform a secondary noise correcting process is provided in addition to the aforementioned correcting process of Embodiment 1. Even when there is noise which cannot be totally removed by the methods in Embodiment 1, the noise is further reduced by the process of this embodiment.

In this embodiment, on condition that a specific inputted document type is attached as bibliographic data to the PDL data inputted from the external PC 109, secondary noise correction is applied to a predetermined pixel in the image data to be processed; thereby enhancing the noise reduction effect. In the secondary noise correction, specifically, when the inputted document type is, for example, a graphic image having a clear difference in color strength between a line drawing and a white background, noise is removed by a subtraction process to remove the color strength left in a pixel which is supposed to be a white background.

Figure 4:
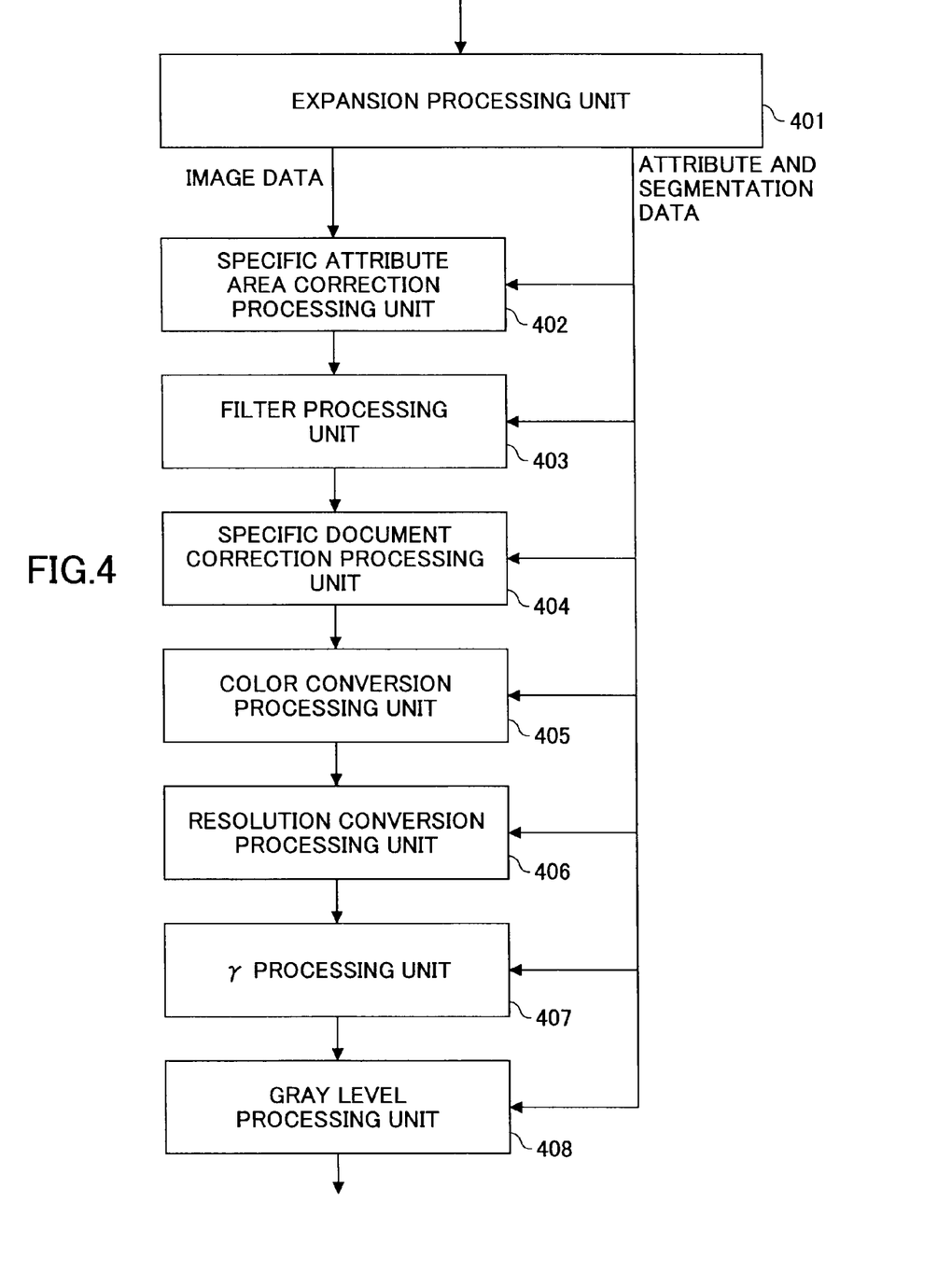
FIG. 4 is a diagram showing an internal configuration and a data flow of an image processing unit (see FIG. 1) according to Embodiment 3.

FIG. 4 shows an internal configuration and a data flow of an image processing unit (see FIG. 1) of this embodiment. The image processing unit shown in FIG. 4 is different from the configuration shown in FIG. 3 in that a specific document correction processing unit 404 which is unique to this embodiment is added. No other part is different from the configuration shown in FIG. 3 except for this point, therefore, the description of FIG. 3 is to be referred to for the corresponding processing units.

In the case of processing a print request made by the external PC 109, PDL data are normally received in this process and a kind of data to be outputted is known at this time in many cases. For example, information about a document type such as whether the data used for printing is JPEG photograph image data or a graphic image data is determined by the external PC 109 which requests printing. The PDL data inputted by the external PC 109 include a document type as bibliographic data attached to the image data. Needless to say, this bibliographic data include the attribute data described in Embodiment 1 as well.

The image data sent by the external PC 109 are accumulated in the HDD 106 temporarily and processed as data used for a plotter output by the image processing unit 112 in accordance with an output of the image writing unit 103. At this time in the image processing unit 112, the compressed image data from the HDD 106 are first inputted to an expansion processing unit 401, where the compressed data are expanded. Further, compressed bibliographic data including the attribute data and the inputted document type are also expanded at the same time.

The expanded image data and attribute data are inputted to a specific attribute area correction processing unit 402, where noise of the image data is corrected depending on the attribute data similarly to Embodiment 1. After that, appropriate frequency correction is applied to the image data in a filter processing unit 403, of which output data are inputted to the specific document correction processing unit 404. Although the inputted document type is inputted at this time, the attribute data are not required in this process.

In the specific document correction processing unit 404, a correcting process is performed depending on the inputted document type. When the document inputted as PDL data from the external PC 109 is found to be a graphic image from its bibliographic data, for example, a subtraction process is performed to only a pixel area with image data of weak color strength, which can be detected as noise, except for a line drawing area. Even when there is noise which cannot be totally removed in the specific attribute area correction processing unit 402, the noise reduction effect can be enhanced by applying the secondary noise correction described in this embodiment to a predetermined pixel with specific image data to be processed.

Embodiment 4

This embodiment relates to a process to output the image data accumulated in the HDD 106 as data which can be used by an external device such as the external PC 109.

The data to be outputted to the external device are processed into a predetermined format by, for example, compressing a 300 dpi sRGB (standard RGB) image using JPEG in order to meet the user's request. Therefore, the image data accumulated in the HDD 106 are processed by the image processing unit 112.

This image processing unit 112 is used in common for outputting image data, including the processing of image data for a plotter output as described in Embodiment 1.

As for a flow of data in the image processing unit 112 to be outputted to the external device, the image data are expanded into image data and attribute data in the expansion processing unit 301 similarly to the plotter output.

After this, the image data are inputted to the specific attribute area correcting process 307. The image data, however, passes through without this correcting process since lossy compression such as JPEG is applied at last when the data are outputted to the external device. When applying the lossy compression in a subsequent step of this correcting process, noise is caused again by the compression after the correcting process. The correcting process can only reduce degradation although noise is sometimes completely corrected. Therefore, secondary degradation may be caused by correction depending on the image data. In order to prevent this secondary degradation, it is better not to apply the correcting process in this embodiment.

After this, an appropriate process is applied to the image data referring to the attribute data in each processing unit of subsequent steps and based on the settings according to the request of an external device that uses the image data. For example, the image data undergo a color conversion process to a sRGB space as a standard color space in the color conversion processing unit 303 and are converted into an image data of 300 dpi in the resolution conversion process to be outputted.

After the processes of the image processing unit 112, the image data undergo JPEG compression in the external I/F controlling unit 107 to be outputted and are sent through the NIC 108 to an external device such as the external PC 109.

In this manner, image degradation can be prevented in this embodiment by turning off the noise correction of the specific attribute area correcting process 307 of the image processing unit 112 when the image data accumulated in the HDD 106 are compressed to be outputted to an external device such as the external PC 109.

Embodiment 5

In this embodiment, in the noise correction of the image processing unit 112 applied to the image data accumulated in the HDD 106 to be outputted, appropriate correction can be performed by adding and changing a correcting process on a target pixel depending on relationships of the target pixel with peripheral pixels.

When outputting the image data accumulated in the HDD 106, the image data to be outputted are processed in the image processing unit 112. In the image processing unit 112, the compressed image data accumulated in the HDD 106 are first expanded in the expansion processing unit 301. After this, a correcting process is performed in the specific attribute area correction processing unit 307 to remove noise generated in the expanded image data.

This correcting process is performed on each pixel of the image data to be processed in Embodiments 1 to 3. In that case, only the attribute data of the pixel are referred to. Therefore, a proper correcting result cannot always be obtained depending on the image data.

In view of this, the correcting process is added or changed depending on the relationship with attribute data of peripheral pixels to make the correcting process more appropriate in this embodiment.

For example, when a target pixel and peripheral pixels of the target pixel have the same attribute data such as attribute data of a graphic image area, image data obtained by smoothing these image data with reference to the image data of the peripheral pixels are used as image data of the target pixel in the correcting process. By this process, noise removal can be effectively performed.

When the target pixel and the peripheral pixels have the same attribute data such as a graphic image area, desirable correction can sometimes be performed by employing a method not to perform correction. That is, in an area where noise is generated or the like, there are discontinuous data. Therefore, the correcting process means very little to an image area such as a graphic image, where data hardly become discontinuous. Therefore, the performance can be enhanced by changing the process so as not to perform correction to an area having a condition that graphic images continue.

In another example, the correcting method can be applied to the case where an area showing text or a line and an area showing an edge of an image as attributes of the image data are mixed in one image.

Figure 5:
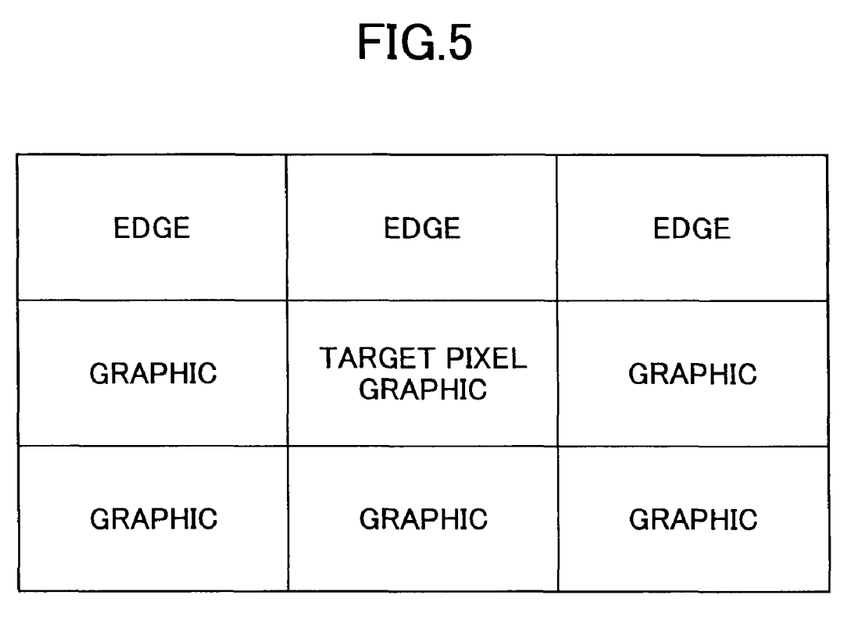
FIG. 5 is a diagram showing a relationship of attribute data between a target pixel and its peripheral pixels.

FIG. 5 shows a relationship of attribute data between a target pixel and its peripheral pixels in this example. As shown in FIG. 5, the attribute data of the target pixel shows an attribute as a picture area of a graphic image with gray level data while the peripheral pixels include pixels with attribute data showing an edge area.

In this case, correction is performed using image data of a pixel except for the pixels with the attribute data showing the edge area. The pixels of the edge area such as text and an adjacent pixel of the picture area are originally different in image data values. Therefore, correction with reference to the image data of the pixels in the edge area with the difference may lead to undesirable image degradation. Thus, image degradation can be appropriately reduced by performing a correcting process by referring the attribute data of the peripheral pixels and excluding the data of the pixels in the edge area, which is inappropriate to be used for correction.

Although the invention has been described with respect to specific embodiment for a complete and clear disclosure, the appended claims are not to be thus limited but are to be construed as embodying all modifications and alternative constructions that may occur to one skilled in the art that fairly fall within the basic teachings herein set forth.

This patent application is based on Japanese Priority Patent Application No. 2007-296021 filed on Nov. 14, 2007, the entire contents of which are hereby incorporated herein by reference.

What is claimed is:

1. An image processing apparatus comprising:
an input processing unit which generates image data and attribute data indicating an attribute of each pixel of the image data from inputted data;
a filter processing unit that performs a predetermined filter process on the image data generated by the input processing unit based on the attribute data generated by the input processing unit;
a first data compression unit which is a lossy data compression unit that compresses the image data filtered by the filter processing unit;
a second compression unit that compresses the attribute data generated by the input processing unit;
a first expansion unit which expands the image data compressed by the first data compression unit;
a second expansion unit which expands the attribute data compressed by the second data compression unit; and
an output image processing unit which processes the image data expanded by the first expansion unit with a process condition corresponding to the attribute data expanded by the second expansion unit to output the image data expanded by the first expansion unit as image data with predetermined data characteristics,
wherein the output image processing unit has a specific attribute area correcting unit which performs a correcting process to remove noise of a pixel in the expanded image data, which is caused by the compression, by replacing an image data value of the pixel having a specific attribute with a value corresponding to the specific attribute, and
wherein the image processing apparatus further comprises a third data compression unit to apply lossy data compression again to the image data processed by the output image processing unit, and a unit which makes the specific attribute area correcting unit not to operate when the third data compression unit applies the lossy data compression to the image data.

2. The image processing unit as claimed in claim 1, wherein when the specific attribute indicates a white background, the specific attribute area correcting unit performs a correcting process to convert the image data value of the pixel having the specific attribute into an image data value of the white background.

3. The image processing apparatus as claimed in claim 1, wherein the specific attribute area correcting unit corrects a target pixel by referring to attribute data of peripheral pixels of the target pixel.

4. The image processing apparatus as claimed in claim 3, wherein when the target pixel does not have attribute data of a text area but the peripheral pixels have the attribute data of the text area, the specific attribute area correcting unit corrects the target pixel by image data of a peripheral pixel having attribute data of except for the text area.

5. An image processing apparatus comprising:
an input processing unit which generates image data and attribute data indicating an attribute of each pixel of the image data from inputted data;
a filter processing unit that performs a predetermined filter process on the image data generated by the input processing unit based on the attribute data generated by the input processing unit;
a first data compression unit which is a lossy data compression unit that compresses the image data filtered by the filter processing unit;
a second compression unit that compresses the attribute data generated by the input processing unit;
a first expansion unit which expands the image data compressed by the first data compression unit;
a second expansion unit which expands the attribute data compressed by the second data compression unit; and
an output image processing unit which processes the image data expanded by the first expansion unit with a process condition corresponding to the attribute data expanded by the second expansion unit to output the image data expanded by the first expansion unit as image data with predetermined data characteristics,
wherein the output image processing unit has a specific attribute area correcting unit which performs a correcting process to remove noise of a pixel in the expanded image data, which is caused by the compression, by replacing an image data value of the pixel having a specific attribute with a value corresponding to the specific attribute,
wherein the specific attribute area correcting unit corrects a target pixel by referring to attribute data of peripheral pixels of the target pixel, and
wherein when the target pixel does not have attribute data of a text area but the peripheral pixels have the attribute data of the text area, the specific attribute area correcting unit corrects the target pixel by image data of a peripheral pixel having attribute data of except for the text area.

* * * * *